J. F. PRIBNOW & N. W. SODERIN.
SWAGE SHAPER.
APPLICATION FILED APR. 19, 1918.
1,279,156.
Patented Sept. 17, 1918.
3 SHEETS—SHEET 1.
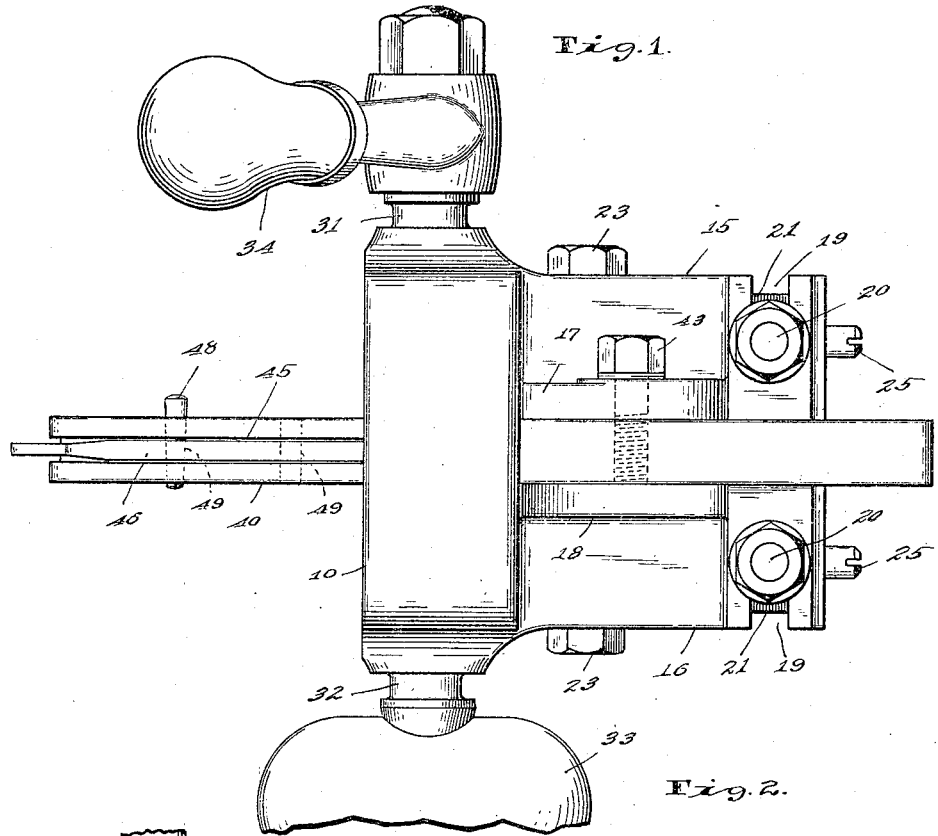
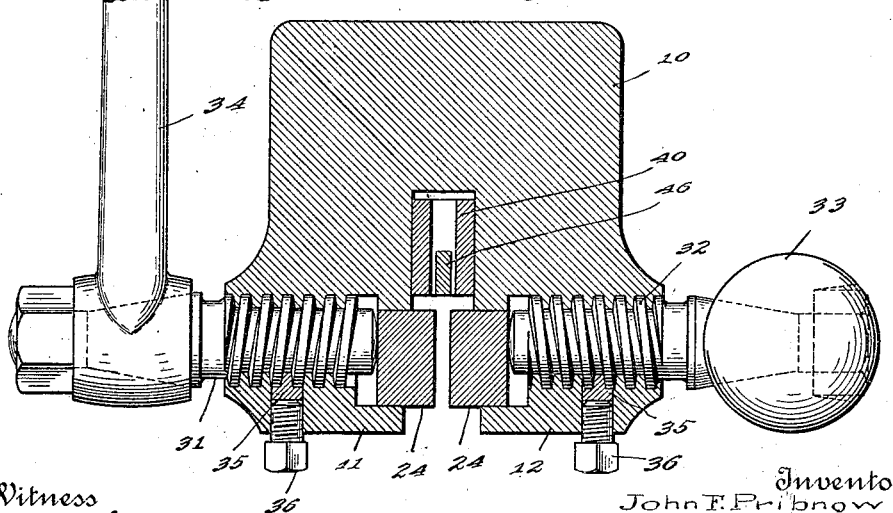
Witness
Frank O. Fahle
Inventor
John F. Pribnow
Nels Waldemar Soderin,
By
Attorneys

J. F. PRIBNOW & N. W. SODERIN.
SWAGE SHAPER.
APPLICATION FILED APR. 19, 1918.

1,279,156.

Patented Sept. 17, 1918.
3 SHEETS—SHEET 2.

Inventors
John F. Pribnow
Nels Waldemar Soderin,

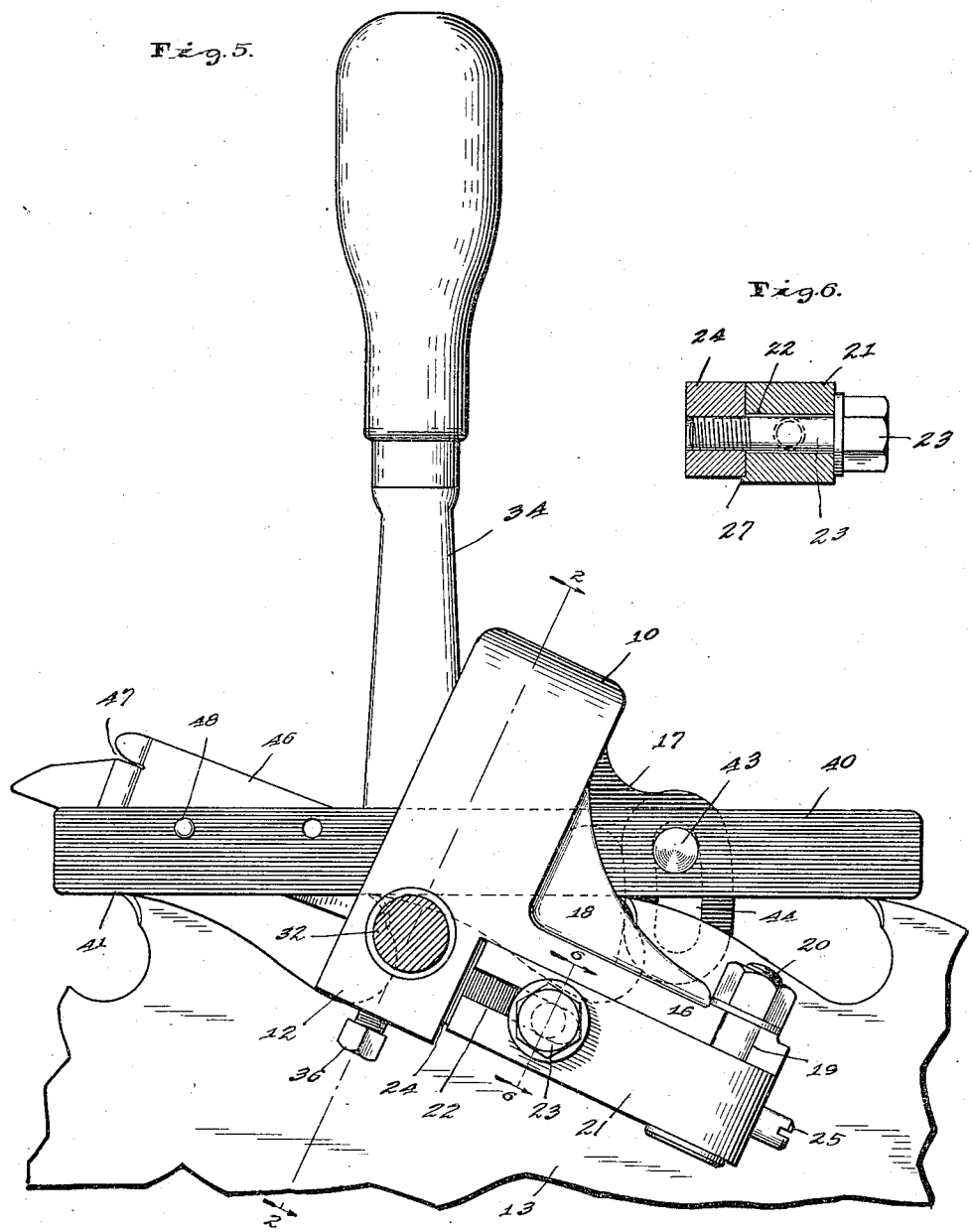

UNITED STATES PATENT OFFICE.

JOHN F. PRIBNOW, OF MELLEN, AND NELS WALDEMAR SODERIN, OF SHEBOYGAN, WISCONSIN, ASSIGNORS TO E. C. ATKINS & COMPANY, OF INDIANAPOLIS, INDIANA, A CORPORATION OF INDIANA.

SWAGE-SHAPER.

1,279,156.     Specification of Letters Patent.     Patented Sept. 17, 1918.

Application filed April 19, 1918. Serial No. 229,488.

*To all whom it may concern:*

Be it known that we, JOHN F. PRIBNOW, a citizen of the United States, residing at Mellen, in the county of Ashland and State of Wisconsin, and NELS WALDEMAR SODERIN, a citizen of Sweden, residing at Sheboygan, in the county of Sheboygan and State of Wisconsin, have invented a new and useful Swage-Shaper, of which the following is a specification.

It is the object of our invention to provide a swage shaper of improved operation and simplified construction. More particularly, it is our object to provide a shaper which is interchangeable for right and left operation; in which the tooth gage is automatically adjustable and self-releasing, and is spring mounted to facilitate progress from one tooth to the next; in which the shaper jaws are mounted in an improved manner, facilitating their adjustment, reversal, and replacement; and in which the guide bar for the teeth is unitary so that it may be made and adjusted as a unit.

The present invention is a development of the shapers shown in Patent No. 972,913, granted October 18, 1910, and Patent No. 1,078,377, granted November 11, 1913, to John F. Pribnow.

Figure 3:
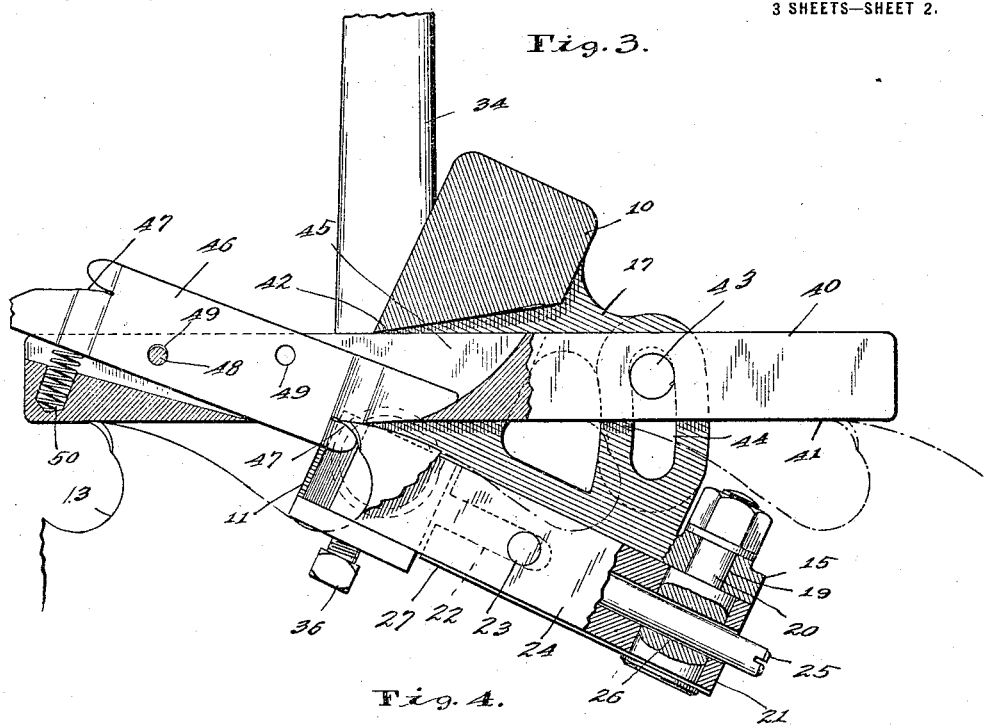
Figure 4:
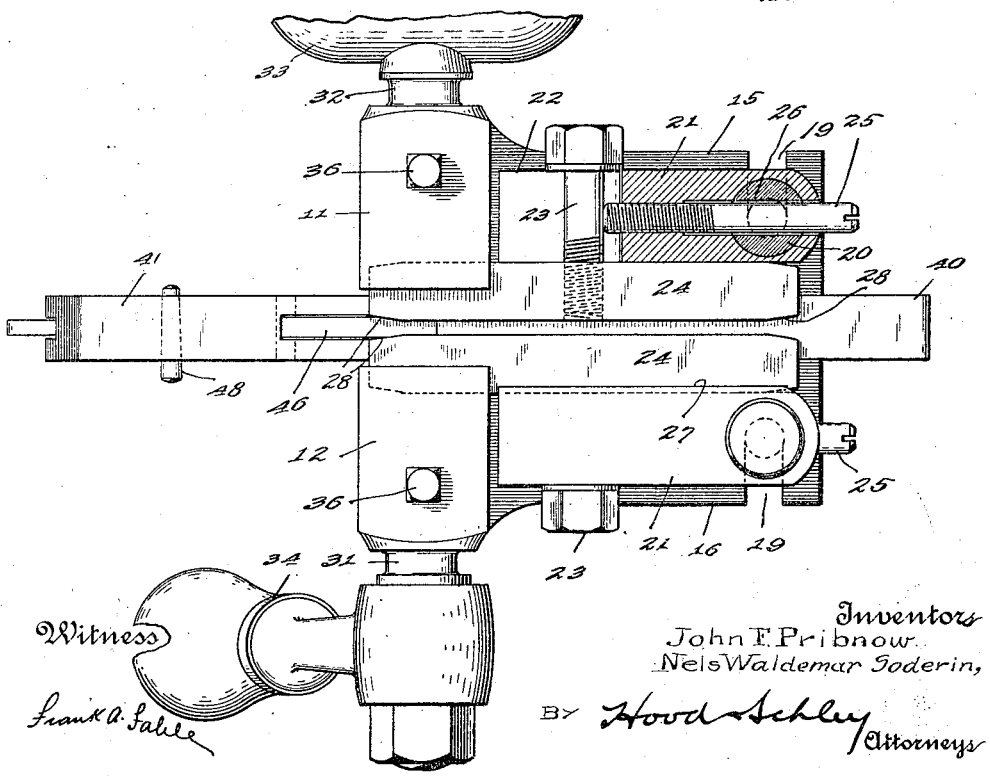

The accompanying drawings illustrate our invention. Figure 1 is a plan of the swage shaper embodying our invention; Fig. 2 is a transverse section through such shaper, taken substantially on the line 2—2 of Fig. 5; Fig. 3 is a longitudinal vertical section through such shaper; Fig. 4 is a bottom view of such shaper, with one of the jaw holders in section; Fig. 5 is an elevation of such shaper; and Fig. 6 is a section on the line 6—6 of Fig. 5.

The main body 10 of the shaper is in the form of a yoke of which the two legs 11 and 12 are located on opposite sides of the saw 13 of which the teeth are to be shaped. Arms 15 and 16 project rearwardly from the lower ends of the legs 11 and 12, their connections to the main body 10 being reinforced by webs 17 and 18. At its rear end, each arm 15 and 16 is provided with a transverse slot 19, which opens laterally to the outer edge of such arm and receives a shouldered pivot bolt 20, which may be removed laterally from such slot. On the enlarged portion of the shouldered bolt 20, between the head thereof and the arm 15 or 16, is pivotally mounted a jaw holder 21. This jaw holder is provided at its free end with a longitudinal open-ended slot 22 transverse to the plane of the saw 13, and extending through this slot 22 is an attaching bolt 23 which is screwed into a threaded hole in the center of an associated shaper jaw 24. An adjusting screw 25 is mounted in the jaw holder 21 and engages the bolt 23 for adjusting the shaper jaw 24 longitudinally. The adjusting screw 25 projects from the rear or pivoted end of the shaper jaw, passing through an enlarged transverse hole 26 in the bolt 20 so that by reason of such enlargement the relatively small turning movement of the shaper jaw holder and shaper jaw about the axis of the bolt 20 is not interfered with. The jaw holder 21 is of slightly greater height than is the shaper jaw 24, and at its lower edge is provided with a flange 27 which projects a short distance under the lower edge or face of the shaper jaw so that it holds the shaper jaw in proper position, against turning about the bolt 23. The parts numbered from 19 to 27 inclusive are all in duplicate, on opposite sides of the saw. By loosening either bolt 20, it and the associated jaw holder 21 and shaper jaw 24 may be removed as a unit, by sliding the bolt 20 out of the open end of the slot 19. After this unit has been removed, the loosening of the bolt 23 permits the shaper jaw and such bolt to be slipped out of the slot 22 as a unit and turned end for end; and the removal of the screw 25 permits the shaper jaw to be turned to bring the other side to working position. In this way the four corners of each shaper jaw may readily be brought into operation, and therefore each such corner is provided with a beveled working face. When in place, the shaper jaw 24 may be adjusted longitudinally by loosening the bolt 23 and adjusting the screw 25. The screw 25 acts in one direction only on the bolt 23, but this is sufficient because the reaction due to the operation tends to move the shaper jaws in the opposite direction.

For operating the shaper jaws 24 for shaping the saw teeth, we provide two screws 31 and 32, which are mounted in the lower ends of the legs 11 and 12 and are left-hand and right-hand screws respectively. The inner ends of these screws bear against the outer faces of the shaper jaws 24 substantially opposite the swaging point, so that by tightening up the screws the jaws 24 are forced inward, and by loosening the screws the shaper jaws are permitted to separate. One of these screws is provided with a knob handle 33, whereby the associated shaper jaw may be adjusted to the desired position, in which it remains during operation. The other screw is provided with an operating lever 34, which is operated to move the associated screw to force its shaper jaw toward the other shaper jaw to produce the shaping operation. Thus in the shaping operation, only one of the shaper jaws is moved, the other remaining stationary. The knob handle 33 and the lever 34 are removably and interchangeably mounted on the outer ends of the screws 31 and 32, so that either jaw 24 may be the stationary jaw and the other the movable jaw, for right-hand or left-hand operation. Associated with each screw 31 and 32 is a clamping lock 35, which may be set or released by a clamping screw 36. This clamping lock 35 is set for that screw 31 or 32 on which the knob handle 33 is mounted, and released for that screw 31 or 32 on which the operating lever 34 is mounted.

Mounted between the two legs 11 and 12 is a guide bar 40, which consists primarily of a straight bar of metal having a straight lower edge 41 which serves as the guide for resting on the teeth of the saw 13. The upper surface of this guide bar bears against the front corner or edge of the cross bar of the yoke 10, as is clear from Fig. 3, and the guide bar is held in the desired position by a clamping bolt 43 which extends through an arc-shaped slot 44 in the web 17 and into a suitable threaded hole in said guide bar. By loosening the bolt 43, the angle between the edge 41 of the guide bar and the plane of operation of the shaper jaw 24 may be varied.

The guide bar 40 is provided with a medial vertical slot 45, near the forward end thereof, and in this slot is loosely mounted a reversible tooth gage 46 having at each end a notch 47 into which when that end is the working end a tooth of the saw 13 may project, so that the faces of such notch bear against the top and the under face of such tooth. The sides of the tooth gage 47 at the ends are shaped so that they conform to the working corners of the two shaper jaws 24. The tooth gage 46 is of less width than the slot 45, and is pivotally mounted on a pivot pin 48 which passes through a hole 49 in the tooth gage slightly larger than such pivot pin, so that the tooth gage has a slight play laterally as well as vertically on its pivot pin. There are two of these holes 49, for use respectively as the pivot holes in the two positions of the reversible tooth gage. The guide bar 40 is provided with holes which register with both holes 49, so that either may be used as the pivotal point or pins 48 may be inserted in both holes at once to prevent the vertical swinging of the tooth gage. When the shaper is used for straight saws, such as band saws, we prefer to use but one pin 48, as shown, so as to allow the working end of the tooth gage to swing upward as the shaper is slid (to the left in Fig. 3) from one tooth to the next, the tooth gage dropping by gravity into position for coöperation with the next tooth when it is reached. This action of gravity may be assisted by a compression spring 50 mounted in a recess in the lower face of the slot 45 so as to press the non-working end of the tooth gage upward and thereby to force the working end downward, such downward movement being limited by the engagement of the projecting finger at the working end of the tooth gage with the under face of the slot 45, as is clear from Fig. 3. When the shaper is used for curved saws, such as circular saws, we prefer to use pins 48 in both holes 49. In either case—that is, whether one or two pins are used—the tooth gage has both a slight lateral and a slight vertical movement or play, which greatly facilitates the separation of the tooth gage from the tooth after the swaging operation.

In operation, the forked main body 10 is put in place so that it straddles the saw 13, and the notch 47 of the tooth gage is brought into engagement with one of the saw teeth. The bolt 43 is loosened to permit the proper adjustment between the guide bar 40 and the plane of operation of the shaper jaws 24; and is then tightened to retain this adjustment. If necessary, the bolts 23 are loosened and the screw 25 adjusted to obtain the proper adjustment of the working bevels 28 of the shaper jaw with each other, with the saw tooth, and with the tooth gage; and when the shaper jaws are properly adjusted the bolts 23 are tightened. Then the screw 31 or 32 on which the knob handle 33 is mounted is adjusted so that its associated shaper jaw 24 has the proper position for coöperating with the other shaper jaw to give the desired tooth shape; and when this adjustment is obtained it is fixed by tightening the screw 36 and the clamping lock 35 of that screw. Then the operating lever 34 is operated to force the two shaper jaws together so that the proper shape is given to the sides of the saw tooth, the beveled faces 28 of the two shaper jaws coöperating to produce this shape. After the device has once been adjusted, the operation is exceedingly rapid, for the device may be set on one tooth, and the operating lever 34 operated first in one direction to force the associated shaper jaw 24 toward the other shaper jaw to produce the shaping operation and then in the other direction to allow the two shaper jaws to separate, whereupon the device is slid rapidly to the next tooth (to the left in Figs. 3 and 5), and the operation is repeated on that tooth. As has been stated, the slight play both laterally and vertically allowed the tooth gage 46 facilitates the separation thereof from the shaped tooth. As the device is moved from one tooth to the next, in straight saws, the working end of the tooth gage 46 swings upward and then downwardly as it passes over the tooth next to be operated upon.

As the beveled faces 28 wear, they may be properly adjusted by the screws 25, and all four working faces 28 of each shaper jaw may be brought into use in turn. The open slots 19 and 22 facilitate the removal and replacement of the working jaws, and their adjustment to bring the desired beveled faces 28 into operation.

We claim as our invention:

1. A swage shaper, comprising a yoke having legs adapted to project on opposite sides of the saw of which the teeth are to be shaped, shaper jaws mounted in said legs, a unitary guide bar projecting in both directions past the working point of said shaper jaws and adapted to engage saw teeth, the angular position of said unitary guide bar with relation to the plane of operation of said shaper jaws being adjustable, and a tooth gage carried by said guide bar for engaging a saw tooth.

2. A swage shaper, comprising a yoke having legs adapted to project on opposite sides of the saw of which the teeth are to be shaped, shaper jaws mounted in said legs, a unitary guide bar projecting in both directions past the working point of said shaper jaws and adapted to engage saw teeth, and a tooth gage carried by said guide bar for engaging a saw tooth.

3. A swage shaper, comprising a yoke having legs adapted to project on opposite sides of a saw of which the teeth are to be shaped, shaper jaws mounted in said legs, a tooth gage for engaging a tooth of said saw, and a pivotal mounting for said tooth gage permitting it to have play both in the plane of the saw and laterally thereof.

4. A swage shaper, comprising a yoke having legs adapted to project on opposite sides of a saw of which the teeth are to be shaped, shaper jaws mounted in said legs, a tooth gage for engaging a tooth of said saw, said tooth gage being provided with a pivot hole, and a pivot pin projecting through said hole and materially smaller than said pivot hole so as to permit play of said tooth gage.

5. A swage shaper, comprising a yoke having legs adapted to project on opposite sides of a saw of which the teeth are to be shaped, shaper jaws mounted in said legs, a tooth gage for engaging a tooth of said saw, a pivotal mounting for said tooth gage permitting it to have play both in the plane of the saw and laterally thereof, and a spring acting on said tooth gage and tending to force the working end thereof toward the saw.

6. A swage shaper, comprising a yoke having legs adapted to project on opposite sides of a saw of which the teeth are to be shaped, shaper jaws mounted in said legs, a tooth gage for engaging a tooth of said saw, said tooth gage being reversible end-for-end so as to bring either end into working position and being provided with two pivot holes which serve as the pivot holes when the two ends of the tooth gage are in working position respectively, and a pivot pin with which either of said pivot holes may be made to coöperate.

7. A swage shaper, comprising a yoke having legs adapted to project on opposite sides of a saw of which the teeth are to be shaped, shaper jaws mounted in said legs, a tooth gage for engaging a tooth of said saw, said tooth gage having two holes through it, and two removable supporting pins coöperating with said holes so that when one pin is used the tooth gage is pivotally mounted and when the other pin is used the pivoting is prevented.

8. A swage shaper, comprising a yoke having legs adapted to project on opposite sides of a saw of which the teeth are to be shaped, shaper jaws mounted in said legs, a tooth gage for engaging a tooth of said saw, said tooth gage having two holes through it, and two removable supporting pins coöperating with said holes so that when one pin is used the tooth gage is pivotally mounted and when the other pin is used the pivoting is prevented, said holes being larger than said pins so as to permit a slight play of said tooth gage on the pins whether one or both pins are used.

9. A swage shaper, comprising a yoke having legs adapted to project on opposite sides of a saw of which the teeth are to be shaped, shaper jaws mounted in said legs, a guide bar adjustably mounted in said yoke for engaging teeth of said saw, said guide bar being provided with a longitudinal slot, and a tooth gage pivotally mounted in said slot for engaging a saw tooth and having play both in the plane of the saw and laterally thereof.

10. A swage shaper, comprising a yoke having legs adapted to project on opposite sides of a saw of which the teeth are to be shaped, shaper jaws mounted in said legs, a guide bar adjustably mounted in said yoke for engaging teeth of said saw, said guide bar being provided with a longitudinal slot, and a tooth gage mounted in said slot for engaging a saw tooth and having play both in the plane of the saw and laterally thereon.

11. A swage shaper, comprising a yoke having legs adapted to project on opposite sides of a saw of which the teeth are to be shaped, shaper jaws mounted in said legs, a guide bar adjustably mounted in said yoke for engaging teeth of said saw, said guide bar being provided with a longitudinal slot, a tooth gage pivotally mounted in said slot for engaging a saw tooth and having play both in the plane of the saw and laterally thereof, and a spring acting between said guide bar and tooth gage and tending to force the working end of the tooth gage toward the saw.

12. A swage shaper, comprising a yoke having legs adapted to project on opposite sides of the saw of which the teeth are to be shaped, said legs having rearwardly projecting arms with open lateral slots, bolts mounted in said slots and removable laterally therefrom, and shaped jaws pivotally mounted on said bolts so that they may be removed laterally with said bolts upon loosening the latter.

13. A swage shaper, comprising a yoke having legs adapted to project on opposite sides of the saw of which the teeth are to be shaped, said legs having rearwardly projecting arms with open lateral slots, bolts mounted in said slots and removable laterally therefrom, jaw holders pivotally mounted on said bolts, and shaper jaws removably mounted on said jaw holders. so that each shaper jaw with its jaw holder and bolt may be removed laterally as a unit from said slot upon loosening said bolt.

14. A swage shaper, comprising a yoke having legs adapted to project on opposite sides of the saw of which the teeth are to be shaped, jaw holders pivotally mounted in said legs, the free end of each jaw holder having a longitudinal slot open at the end, a bolt passing through the slot in each jaw holder and laterally removable from the open end of said slot, and a shaper jaw mounted on each bolt so that it is removable from the jaw holder as a unit with such bolt.

15. A swage shaper, comprising a yoke having legs adapted to project on opposite sides of the saw of which the teeth are to be shaped, jaw holders pivotally mounted in said legs, a shaper jaw associated with each jaw holder, and a single bolt clamping each shaper jaw to its associated jaw holder, each of said jaw holders having a flange which projects over an edge of the associated shaper jaw to prevent turning of the shaper jaw on said bolt.

16. A swage shaper, comprising a yoke having legs adapted to project on opposite sides of the saw of which the teeth are to be shaped, pivot bolts mounted in said legs, jaw holders pivotally mounted on said pivot bolts, shaper jaws associated with the jaw holders, an attaching bolt for attaching each shaper jaw to its associated jaw holder, said shaper jaws being provided with slots through which said attaching bolts extend, and a longitudinal screw mounted in each shaper jaw and coöperating with the associated attaching bolt for adjusting the latter and the associated shaper jaw longitudinally of the jaw holder, each pivot bolt being provided with an enlarged transverse hole through which said adjusting screw freely extends so that interference with the movement of the shaper jaw on the pivot bolt is avoided.

17. A swage shaper, comprising a yoke having legs adapted to project on opposite sides of the saw of which the teeth are to be shaped, pivot bolts mounted in said legs, jaw holders pivotally mounted on said pivot bolts, shaper jaws associated with the jaw holders, an attaching bolt for attaching each shaper jaw to its associated jaw holder, said shaper jaws being provided with slots through which said attaching bolts extend, and a longitudinal screw mounted in each shaper jaw and coöperating with the associated attaching bolt for adjusting the latter and the associated shaper jaw longitudinally of the jaw holder.

18. A swage shaper, comprising a yoke having legs adapted to project on opposite sides of the saw of which the teeth are to be shaped, shaper jaws mounted in said legs, two screws mounted in said legs and operating on the respective shaper jaws for forcing them toward each other, an adjusting handle and an operating handle interchangeably mounted on said two screws, and means for locking either screw in adjusted position.

19. A swage shaper, comprising a yoke having legs adapted to project on opposite sides of the saw of which the teeth are to be shaped, shaper jaws mounted in said legs, a right-hand screw and a left-hand screw mounted respectively in said legs and operating on the respective shaper jaws for forcing them toward each other, an adjusting handle and an operating handle interchangeably mounted on said two screws, and means for locking either screw in adjusted position.

20. A swage shaper, comprising a yoke having legs adapted to project on opposite sides of the saw of which the teeth are to be shaped, shaper jaws mounted in said legs, two screws mounted in said legs and operating on the respective shaper jaws for forcing them toward each other, and an adjusting handle and an operating handle interchangeably mounted on said two screws.

21. A swage shaper, comprising a yoke having legs adapted to project on opposite sides of the saw of which the teeth are to be shaped, shaper jaws mounted in said legs, two screws mounted in said legs and operating on the respective shaper jaws for forcing them toward each other, an adjustable handle and an operating handle interchangeably mounted on said two screws, and a releasable locking device associated with each screw.

22. A swage shaper, comprising a yoke having legs adapted to project on opposite sides of the saw of which the teeth are to be shaped, shaper jaws mounted in said legs, a guide bar mounted in said yoke for engaging a plurality of saw teeth, and a tooth gage carried by said guide bar for engaging a saw tooth.

23. A swage shaper, comprising a yoke having legs adapted to project on opposite sides of the saw of which the teeth are to be shaped, shaper jaws mounted in said legs, a guide bar mounted in said yoke for engaging a plurality of saw teeth, the annular position of said guide bar with relation to the plane of operation of said shaper jaws being adjustable, and a tooth gage carried by said guide bar for engaging a saw tooth.

In witness whereof, I have hereunto set my hand, at Alexandria, La., this 6th day of April, one thousand nine hundred and eighteen.

JOHN F. PRIBNOW.

In witness whereof, I have hereunto set my hand at Sheboygan, Wis., this 6th day of April, one thousand nine hundred and eighteen.

NELS WALDEMAR SODERIN.

Copies of this patent may be obtained for five cents each, by addressing the "Commissioner of Patents, Washington, D. C."